June 26, 1951 C. M. O'LEARY 2,558,193
CHANGE-SPEED TRANSMISSION MECHANISM
Original Filed June 30, 1945 5 Sheets-Sheet 1

INVENTOR.
Charles M. O'Leary.
BY
Harness, Dickey & Pierce.
ATTORNEYS.

June 26, 1951            C. M. O'LEARY            2,558,193

CHANGE-SPEED TRANSMISSION MECHANISM

Original Filed June 30, 1945            5 Sheets-Sheet 4

INVENTOR.
Charles M. O'Leary.
BY
Harness, Dickey & Pierce
ATTORNEYS.

June 26, 1951      C. M. O'LEARY      2,558,193
CHANGE-SPEED TRANSMISSION MECHANISM
Original Filed June 30, 1945      5 Sheets-Sheet 5

INVENTOR.
Charles M. O'Leary.
BY
Harness, Dickey & Pierce.
ATTORNEYS.

Patented June 26, 1951

2,558,193

UNITED STATES PATENT OFFICE 2,558,193

CHANGE-SPEED TRANSMISSION MECHANISM

Charles M. O'Leary, Los Angeles, Calif.

Original application June 30, 1945, Serial No. 602,619. Divided and this application March 29, 1946, Serial No. 657,959

6 Claims. (Cl. 74—730)

1

The present invention relates to a power transmission mechanism which is particularly adapted for use in heavy duty hoisting operations, such as those encountered in oil well drilling and particularly in the case of deep wells; and this application is a division of applicant's copending application, Serial No. 602,619, filed June 30, 1945.

A very large portion of the total drilling time and, therefore, of the cost of the operation is spent in pulling the drilling stem from the well to renew the drilling bit and then returning the stem and bit to drilling position. In view of the heavy weights involved on the hoisting drum, very large amounts of power and great flexibility of control are required to pull the drill stem from the well as rapidly as possible in order to reduce the waste time. In addition, very heavy duty and relatively expensive braking equipment is now used for the hoisting drum to control the descent of the drill stem in the hole.

In the past, because of its great power and flexibility, steam driven apparatus has given superior performance. However, the steam boilers and engines required to operate a deep well drilling rig are very large, expensive, and difficult to transport. Attempts have been made in the past to approximate steam engine performance by the use of a combination of one or more internal combustion engines connected to the hoisting drum through a hydrokinetic torque converter. Such a combination provides an exceedingly high starting torque which is required, and a desirable automatic decrease in torque ratio as the speed of the drum increases during hoisting operations. However, the efficiency of hydrokinetic torque converters is very low, except at a fixed speed ratio, and in the prior mechanisms it has not been possible to maintain the torque ratio on a converter at or near the point of maximum efficiency during any appreciable portion of the hoisting operation. As a result, the torque converters have been subject to destructive heat generation, and it has not been possible to realize their full advantage. In addition, due to the heat generation in the torque converter, it has not been possible to operate with the output of the converter either stationary or operating at very low speeds for any appreciable period of time.

The above defects in prior torque converter operated drilling rigs are, to a large extent, overcome by the use of the apparatus disclosed in applicant's copending application, Serial No. 571,656, filed January 6, 1945, wherein the torque converter is connected to the hoisting drum

2 through an automatic two-speed transmission and a manually selectable change-speed transmission which will provide a plurality of different torque ratios in the drum drive. The automatic transmission is so arranged as to decrease the torque multiplication ratio between the torque converter and the drum when the speed ratio of the converter exceeds the ratio of its efficient operating range. The decreased toque multiplication ratio thus provided automatically restores the converter to its minimum efficient speed ratio without changing the speed of or the torque applied to the hoisting drum. With the apparatus of said copending application, it is possible for the operator, in the exercise of his judgment, to preselect a speed ratio in the manual transmission which will approximate that required to hoist a stand of drill pipe, and once the hoisting has started the automatic transmission will operate to maintain the speed ratio of the converter in its efficient range provided the proper speed ratio in the manual transmission was properly selected. However, there is a substantial range in torque on the hoisting drum from the high starting torque to the minimum torque during the hoisting of each stand of drill stem, and, consequently, if the speed ratio of the manual transmission is not properly selected the torque range available within the efficient speed ratio range of the torque converter may not be sufficient, in which event the torque converter will operate in part in an inefficient range. Moreover, the operator has no way of knowing whether the torque converter is operating at an efficient speed ratio or not, and, consequently, may continue to operate the apparatus under inefficient conditions.

Accordingly, it is the general object of the present invention to provide an improved form of power transmission system including a hydrokinetic torque converter and a manually operable change-speed transmission capable of being shifted under load, and incorporating means for indicating to the operator when a shift in speed ratio is necessary or desirable as well as the character of the speed ratio change required.

Other objects and advantages will become apparent from the following specification, the accompanying drawings, and the appended claims.

Figure 1:
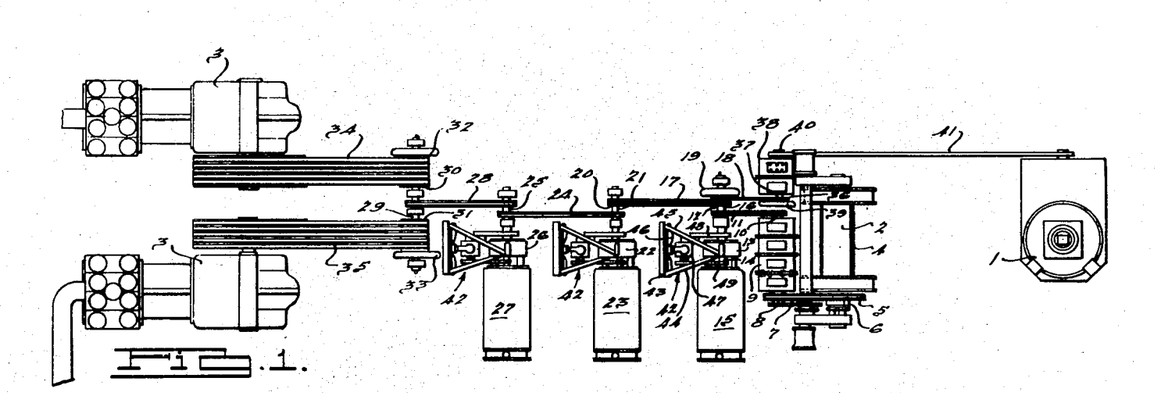
Figure 1 is a more or less diagrammatic plan view of the complete drilling mechanism excluding only the rig and sheaves which are connected in the usual manner by a cable to the hoisting drum.

Referring to Figure 1, the complete apparatus includes a rotary table 1, a hoisting drum 2, and slush pumps 3, of conventional construction. It will be understood that the drum is connected to the hoisting sheaves of the drilling rig in the usual manner by means of a cable 4, which is wound on the drum. The drum 2 is adapted to be rotated by a sprocket 5 connected in the usual manner by a clutch 6 to the drum shaft and which is driven by means of chains 7 from a sprocket on the output shaft 8 of a change-speed transmission 9. The input shaft 10 of the transmission is connected by a chain 11 to a sprocket fixed to a shaft 12. The shaft 12 constitutes the output shaft of a hydrokinetic torque converter 13, the input shaft 14 which is connected to an internal combustion engine 15. The shaft 12 also carries a double sprocket 16 adapted to carry chains 17 and 18. The double sprocket 16 normally runs freely on the shaft 12 but may be fixed thereto by energization of a pneumatic clutch, indicated diagrammatically at 19. Chain 17 runs over a sprocket 20 on shaft 21 which is the output shaft of a second torque converter 22 connected to a second engine 23. The shaft 21 is also connected by a chain 24 and suitable sprockets to a shaft 25 which constitutes the output shaft to a third hydrokinetic torque converter 26, the input of which is connected to a third engine 27. Shaft 25 is connected by means of a chain 28 and suitable sprockets to a countershaft 29 carrying a pair of sprockets 30 and 31. The sprockets 30 and 31 normally run freely on the shaft 29 but may be fixed thereto by actuating either one or both of a pair of pneumatic clutches indicated diagrammatically at 32 and 33. The sprockets 30 and 31 carry chains 34 and 35, respectively, which drive the slush pumps 3.

The previously mentioned chain 18 on the double sprocket 16 is connected to a sprocket 36 on an input shaft 37 of a table transmission 38. The sprocket 36 normally runs freely on the input shaft 37 but may be clutched thereto by energizing a pneumatic clutch 39. The output shaft 40 of the transmission 38 is connected by means of a chain 41 to the rotary table in the usual manner.

As a result of the above connections, during hoisting operations, all three of the engines 15, 23 and 27 may be connected to the hoisting drum by energizing clutch 19 and de-energizing clutch 39. At this time the slush pumps may be disconnected by de-energizing the clutches 32 and 33, thus making available the full power of all three members for hoisting. During drilling operations, the clutch 19 may be de-energized and the clutches 32 or 33 energized. In that case, engines 23 and 27 will drive the rotary table 1 and one or both of the slush pumps 3, while the engine 15 will remain connected to the hoisting drum through the transmission 9. The engine compounding features of this application are claimed in applicant's copending application, Serial No. 676,450, filed June 13, 1946.

Figure 3:
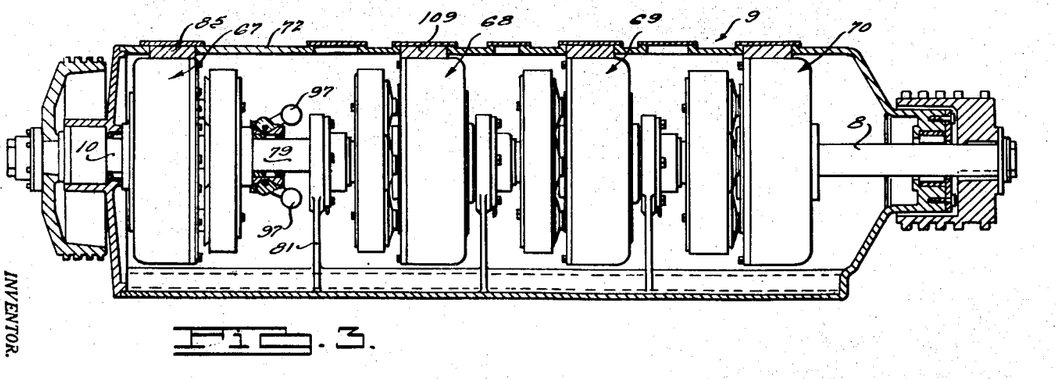
Figure 3 is a longitudinal section taken through the combined automatic and manually controlled change-speed transmission shown in Figure 1.

As best shown in Figures 1 and 3, each of the hydrokinetic torque converters 13 is provided with a differential cooling mechanism indicated generally at 42. This mechanism is preferably constructed in the manner set forth in greater detail in said copending application, Serial No. 571,656, now abandoned, and disclosed and claimed in applicant's copending application, Serial No. 666,626, filed May 2, 1946. Briefly stated, the mechanism includes a cooling radiator 43, suitable conduits 44 and 45 for circulating the operating liquid of the converter through the radiator, and an air circulating fan 46 which is differentially driven from the input shaft 14 and the output shaft 12 of the converter by a differential mechanism 47 and a pair of chains 48 and 49. The chain 48 is trained over a suitable sprocket on the output shaft 12 of the converter and about a sprocket 50 associated with the differential mechanism. The chain 49 is similarly trained over a suitable sprocket on the input shaft of the torque converter and over a sprocket 51 associated with the differential mechanism.

Figure 2:
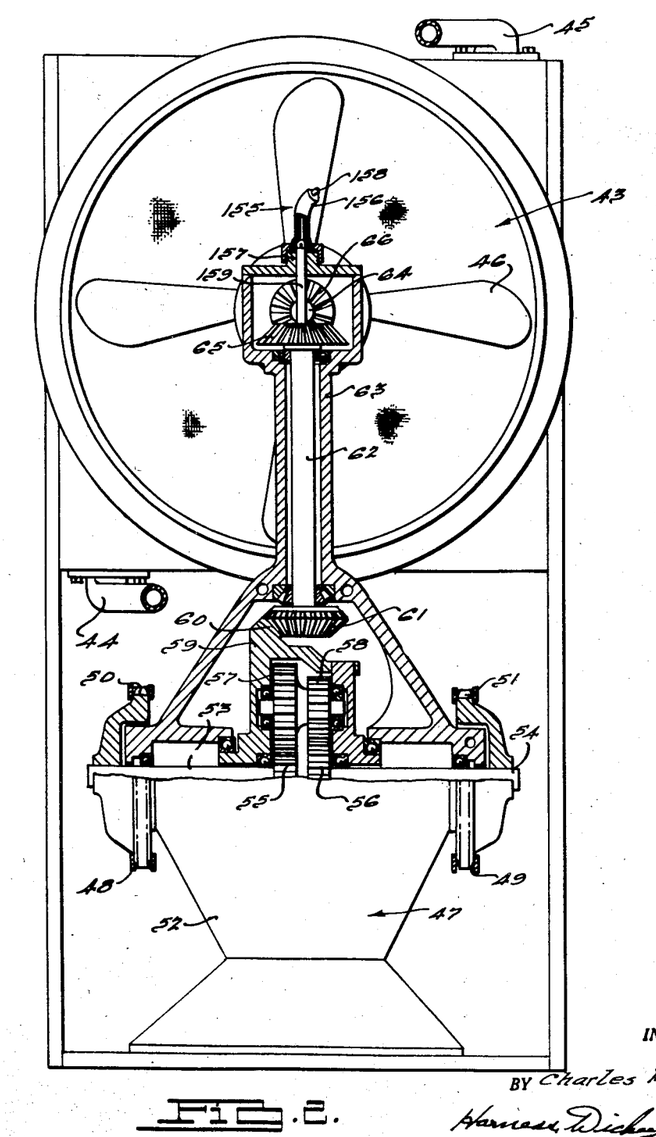
Figure 2 is an enlarged elevation view partly in section showing differential cooling mechanism for one of the torque converters.

As best shown in Figure 2, the differential mechanism comprises a casing 52 which journals and supports a shaft 53 which carries the sprocket 50, and a second shaft 54 which carries the sprocket 51. The shaft 53 is provided with a spur gear 55, and the shaft 54 is provided with a larger spur gear 56. A plurality of planetary gear clusters co-operate with the gears 55 and 56, and one of such clusters appears in Figure 2. As there shown, each planetary cluster includes a spur gear 57 and a spur gear 58, the two being integrally connected together and journaled in a cage 59. The cage in turn is journaled for rotation about the axis of shafts 53 and 54 by suitable bearings on the casing 52 and also provides a bearing support for the inner ends of the shafts 53 and 54. Formed integrally on the planetary cage 59 is a bevel ring gear 60 which meshes with a bevel gear 61 on a vertically extending shaft 62 which is journaled in a projecting portion 63 of the casing 52. The upper end of the projecting portion 63 of the casing rotatably supports a fan shaft 64 for the fan 46, and the shafts 62 and 64 are connected by means of bevel gears 65 and 66.

It will be noted that when the planetary cage 59 is held stationary and either the shaft 53 or the shaft 54 rotated, that the shaft 53 will rotate at a higher speed than the shaft 54, due to the difference in sizes between the intermeshing sets of gears. The relative sizes of the gears are so selected that the ratio of speeds between the shaft 53 and the shaft 54, when the planetary cage 59 is stationary, is equal to the speed ratio of the torque converter when operating at its maximum efficiency. In the usual case, the speed ratio of the output of the torque converter to the input at maximum efficiency is between four-tenths and five-tenths. Consequently, the relative sizes of the gears 55 through 58 will be selected to provide a corresponding ratio between the shafts 53 and 54. As a result of this arrangement, when the torque converter is operating at maximum efficiency the cage 59 and, therefore, the fan 46 will be stationary. However, as the speed ratio of the converter departs from its ratio of maximum efficiency in either direction, the fan will be rotated in one direction and the other at a speed approximately proportional to the extent to which the speed ratio of the converter departs from its ratio of maximum efficiency. Consequently, the cooling effect of the differential cooling mechanism 42 will be generally proportional to the amount of heat generated in the converter.

If desired, a small auxiliary cooling unit may be employed in connection with the converter which will dissipate at all times the amount of heat generated when the torque converter is operating at maximum efficiency. The total cooling effect will then be the sum of the effects of the two units.

The remaining members 23 and 27 are equipped with similar cooling units 42 which need not be further described.

The interior construction of the transmission 9 is best shown in Figures 3, 4, 5 and 6. As there shown, the unit comprises an automatic planetary two-speed transmission 67 and three manually controlled two-speed planetary transmissions 68, 69 and 70, all of which are connected in series. All four of the transmissions 67, 68, 69 and 70 are identical in construction except for a difference in the speed ratios they provide, and the fact that transmission 67 is automatically operated while the remaining transmissions are manually controlled.

Figure 4:
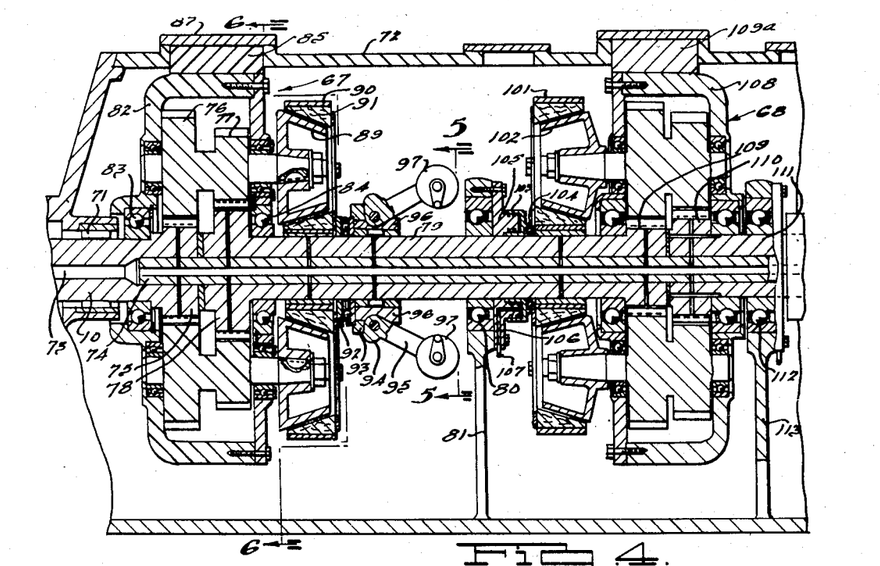
Figure 4 is a further enlarged fragmentary, longitudinal section of a portion of the transmission shown in Figure 3.

As best shown in Figure 4, the input shaft 10 is journaled in suitable bearings 71 carried by the housing 72 of the transmission. This shaft is provided with a bored opening 73 through which lubricating oil may be supplied, and at its right-hand end is counterbored to receive a tubular pilot extension 74 which is fixed to the output shaft 8 and extended entirely through the transmission. The right-hand end of the input shaft 10 is provided with a gear 75 adapted to mesh with a plurality of planet gears 76, each of which has fixed thereto a smaller planet gear 77 which is in mesh with a gear 78 on a tubular shaft 79. Shaft 79 is supported in a suitable antifriction bearing 80 carried by a web 81 formed in the housing 72 and is also supported upon the pilot extension 74 of the output shaft 8.

Each of the planet gear clusters 76 and 77 is journaled by means of antifriction bearings in a planet cage 82 which in turn is journaled on suitable antifriction bearings 83 and 84 carried by the shafts 10 and 79, respectively. As a result of this construction, clockwise rotation of the shaft 10 as viewed from the output end of the transmission tends to rotate the planet cage 82 in counterclockwise direction. However, if such rotation of the cage is prevented, clockwise rotation of the shaft 10 will rotate shaft 79 in the same direction at a reduced speed ratio. In order to prevent such counterclockwise rotation of the planet cage 82, there are provided a plurality of one-way brake blocks 85 which are fitted within openings 86 formed in the casing 72 and are held in position by means of cover plates 87.

Figure 6:
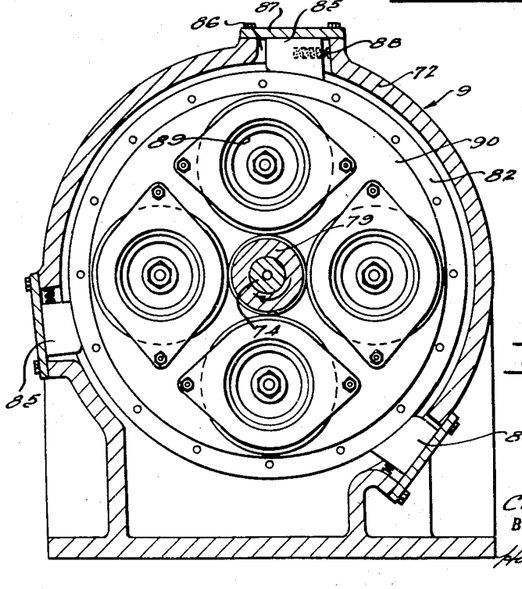
Figure 6 is a transverse section taken on the line 6—6 of Figure 4.

The three blocks 85 are spaced equally around the cage 82, as best shown in Figure 6. A spring 88 normally acts to wedge the blocks between the cover plate 87 and the cylindrical periphery of cage 82. Thus, the three blocks 85 acts as a one-way brake between the stationary casing and the cage 82, operating to prevent counterclockwise rotation of the casing, as viewed in Figure 6, so that the transmission unit 67 will provide an increase torque multiplication.

When it is desired to operate at a one-to-one ratio through the unit 67, it is only necessary to lock the planet gears against rotation about their own axes. This is accomplished by means of a plurality of clutch cones 89, one of which is fixed to each of the planet gear sets, and a co-operating clutch plate 90 provided with four coned clutch rings 91, one for each cone clutch element 89. The clutch plate 90 is slidable axially on the shaft 10 and is also free to rotate with respect thereto. When the clutch plate 90 is shifted to the left, as viewed in Figure 4, the cone clutch elements 89 are gripped by the cone clutches 91 and held against rotation about their own axes. This provides a direct one-to-one drive between the gears 75 and 78. During this condition, the carriage 82 rotates freely in a clockwise direction, as viewed in Figure 6, at the same speed as the shafts 10 and 79.

Figure 5:
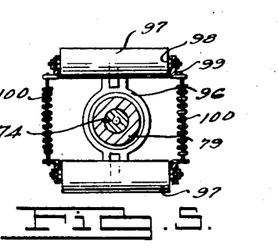
Figure 5 is a fragmentary section taken on the line 5—5 of Figure 4.

Means are provided to shift the clutch plate 90 into clutching position when the shaft 79 reaches a predetermined speed. This means comprises an antifriction thrust bearing 92 between the clutch plate 90 and a hardened ring 93. The ring 93 in turn is adapted to be forced to the right, as viewed in Figure 4, by projection 94 on an arm 95 which is pivotally mounted upon a ring 96 surrounding the shaft 79 and fixed thereto. The extremity of the arm 95 carries a cylindrical weight 97 which tends to swing the arms outwardly with a force which is a function of the speed of the shaft 79. Two weighted arms 95 are provided, each having a weight 97, as best shown in Figures 4 and 5. At each end of each of the weights there is provided a hexagonal projection 98 adapted to fit a correspondingly shaped hexagonal recess in a spring bracket 99, as a result of which the spring brackets may be mounted on the ends of the weights in any desired angular position around the axes of the weights 97. The bracket is held in the desired adjusted position by means of a nut. Extending between the brackets on the weights are a pair of springs 100 which constantly act to hold the weights and, therefore, the arms inwardly against the action of centrifugal force. The tension of the springs may be adjusted by adjusting the angular position of the spring brackets 99 with reference to the cylindrical weights 97. The strength of the springs is preferably such that the weights will not move outwardly until the speed of the shaft 10 reaches a speed corresponding to the speed at which the torque converter is operating at its maximum efficient speed ratio, as more fully set forth in applicant's aforementioned copending application, Serial No. 571,656. It is sufficient to state here simply that the centrifugal weights 97 and associated mechanism operate the clutch and thus shift the transmission element 67 into a condition of direct drive when the speed ratio of the torque converter reaches a desired maximum value. The torque multiplication ratio of the transmission 67 when the clutch rings 91 are disengaged, is preferably in the order of two to one, with the result that engagement of the clutches 91 cuts the torque multiplication between the torque converter and the hoisting drum approximately in half. As a result, for a given load on the hoisting drum the torque on the converter will be doubled and the speed ratio of the converter reduced to half that at which the engagement of clutches 91 occurred, without any change in the speed of output or the torque applied to the drum. This combination of a hydrokinetic torque converter and an automatic two-speed transmission is claimed in applicant's copending application, Serial No. 647,677, filed February 15, 1946.

Each of the remaining transmission units 68, 69 and 70 is identical in construction and mode of operation to the above described transmission unit 67 except that they provide different torque multiplication ratios when the cone clutches are released and the cone clutches are controlled manually. As best shown in Figure 4, the preferred method of operating the clutch plates of the manually controlled transmission units is by air pressure. Thus, as there shown, the clutch plate 101 for the transmission unit 68 is shifted to the right to effect engagement of the cone clutches 102 by means of an annular movable cylinder element 103 which bears against an antifriction thrust bearing 104 to shift the clutch plate 101 to the right, as viewed in Figure 4. The annular cylinder element co-operates with an annular piston 105 which is supplied with operating fluid through a passageway 106 and a conduit 107. As a result, upon application of fluid under pressure to the conduit 107, the cone clutches 102 will be engaged and the transmission unit 68 locked in a one-to-one ratio. When the fluid pressure is released, the clutch plate 101 will disengage and the planetary cage 108 will be held against clockwise rotation by a plurality of one-way brake blocks 109a similar in construction and mode of operation to the previously mentioned brake blocks 85. Under these conditions, transmission unit 68 will provide an increased torque multiplication between a gear 109 on the right-hand extremity of shaft 79 and a gear 110 on the left-hand extremity of a tubular shaft 111 which extends over the pilot projection 74 on shaft 8 and which is journaled in antifriction ball bearings 112 carried by a web 113 of the casing 72.

It will be understood that the shaft 111 is connected by means of the transmission unit 69 to a fourth tubular shaft intermediate the transmission units 69 and 70, and that the fourth tubular shaft will be connected in the same manner between transmission unit 70 to the output shaft 8 of the transmission. The construction and mode of operation of the transmission units 69 and 70 being identical to that of the transmission unit 68 is not illustrated in detail and need not be further described except to note that the torque multiplication ratios provided by the transmission units 68, 69 and 70 differ from each other in such a manner that by selectively engaging or disengaging the operating clutches of one or more of the three units a total of eight different speed ratios may be obtained. Moreover, these eight different speed ratios may each differ from each other successively by the same percentage. For example, if the sizes of the gears in the three transmissions are so chosen that transmission unit 68 gives a torque multiplication of 1.26, transmission unit 69 gives a torque multiplication ratio of 1.59, and transmission unit 70 gives a torque multiplication ratio of 2.50, then the three units of the transmission will provide the following eight torque ratios by energization of the clutches of the indicated units:

| Torque Ratio | Clutches Engaged in Units |
| --- | --- |
| 1.00 | 68, 69 and 70. |
| 1.26 | 69 and 70. |
| 1.59 | 68 and 70. |
| 2.00 | 70. |
| 2.50 | 68 and 69. |
| 3.17 | 69. |
| 4.00 | 68. |
| 5.04 | None. |

It will be noted that each of the torque ratios thus provided is approximately 26 percent greater than the preceding torque ratio. It will be understood, however, that any desired torque ratios may be provided by suitably proportioning the gears of the transmission unit.

In addition to the above, each of the above torque ratios is doubled by the automatic transmission 67 when the speed of the shaft 79 is below a predetermined value. Consequently, the automatic transmission provides higher starting torque ratios and automatically cuts those ratios in half when the shaft 79 reaches a predetermined speed.

The cone clutches of the transmission units 67, 68, 69 and 70 may be self-releasing when the clutch applying force is relieved or, if desired, clutch release springs may be provided in the usual manner.

An important feature of the form of transmission, as illustrated and described above, resides in the fact that all of the gears of the transmission are constantly in mesh and a shift from one ratio to another is effected simply by engaging or disengaging the cone clutch elements. Consequently, there is no possibility of dropping the load incident to a shift from one gear ratio to another. Moreover, the cone clutch units which are engaged to effect a direct connection are each subject to a torque loading which is less than one-fourth of the input torque. In fact, with a unit designed to provide a two-to-one ratio when the cone clutches are disengaged, the torque applied to each of the cone clutches during direct drive is only about 18 percent of the total input output torque of the unit. When the cone clutches are released to increase the torque ratio, the planet cages immediately slow down but are prevented from rotating reversely by the one-way brake blocks 85, 109a, etc., with the result that the increase torque multiplication becomes effective without any cessation in the drive impulse to the drum. The one-way brake blocks themselves, being located a substantial distance from the center of rotation, are subject to relatively low holding forces for a given delivered torque.

A further feature of the transmission resides in the fact that the tooth loading between the gears being distributed between the four sets of planet gears is only one-fourth that of the corresponding transmission of conventional design. Moreover, what is more important, none of the torque loads transmitted through the transmission subject the shaft bearings to any radial loads. Consequently, the bearings, such as bearings 83, 84, 80, etc., need only be large enough to maintain the shafts in alignment. The only bearings which are subject to radial loads are the bearings which support the planet gears, and these bearings are not only relatively closely coupled on the rigid planet gear clusters, but the torque load is distributed between the four sets of planet gears in each transmission and is reduced by reason of location of the bearings at a substantial distance from the axis of the main transmission shaft. The braking blocks 85, being equally spaced around the cage 82, also assist in keeping the shafts in alignment. Accordingly, the design is peculiarly suited to the transmission of the very heavy torques required for oil well hoisting drums.

Another feature of the transmission which is of importance in well drilling operations resides in the fact that in the event of failure of the air pressure supply for operating the clutches, or of failure of the clutches themselves the transmission automatically shifts into maximum torque multiplication. Consequently, there is no danger of dropping a load on the hoisting drum. Ready access may be had to the one way brake blocks for inspection and replacement.

An important feature of the transmission 9 resides in the fact that it is constructed to a large extent from a plurality of identical parts, with a consequent saving in cost. All of the planetary cages such as the cages 82 and 108 and the similar cages in the transmission units 69 and 70 are identical in construction. This is achieved by locating the axes of the planet cluster gears in each of the transmissions on the same center lines. This can be done and a difference in torque multiplication ratio still provided by simply changing the relative sizes of the gears in the cluster. Likewise, the cone clutch units and the clutch plates of all four of the transmission units are identical, the operating mechanisms for the three transmission units 68, 69, and 70 are likewise identical and the one-way brake blocks of all four units are the same. As a result of this fact, there is provided at low cost a very rugged eight speed transmission which can be shifted under full load and which also incorporates an automatic two speed transmission.

Means are provided in the form of a single control lever for selectively actuating the clutches and the transmission units 68, 69 and 70 to produce the eight progressively increased multiplication ratios referred to above. This means, as best shown in Figures 7 through 12, comprises a control box indicated generally at 114 having suitably mounted therein three three-way control valves 115, 116, and 117 for controlling the operation of the fluid operated clutches in the transmission units 68, 69, and 70 respectively. Likewise mounted within the control box is a camshaft 118 having cams 119, 120, and 121 adapted respectively to control the operating plungers 122, 123, and 124 of the valves 115, 116, and 117, respectively. The camshaft is provided with a pinion 126 adapted to cooperate with a gear sector 127 fixed to a control shaft 128 having an operating handle 129. The operating handle projects through a slot 130 formed in an arcuate wall portion 131 of the control box 114. Alongside of the slot are provided suitable indicia, such as the numbers one through eight, representing eight torque ratios available in the transmission.

The operating cylinders and pistons for the clutches in the transmission units 68, 69 and 70 are preferably pneumatically operated, in which event the three control valves 115, 116, and 117 may be any desired or conventional form of three-way air valves. Thus valve 115 may be a three-way air valve having an inlet port 132 which may be connected to any suitable source of air under pressure, not shown, an outlet port 133, which is connected in any suitable manner to the conduit 107 for the air clutch operating piston and cylinder unit 103, 105, of transmission unit 68, and an exhaust port 134 which communicates with the atmosphere. The particular valve illustrated more or less diagrammatically is of the type in which the outlet port 133 is normally in communication with the exhaust port 134, and communication is blocked between the ports 132 and 133. The trapped air pressure in port 132 acts to hold the valve operating plunger 122 in its downwardly projected position. When the valve operating plunger 122 is forced upwardly, as viewed in Figure 9, communication between ports 133 and 134 is closed, and communication between ports 132 and 133 is open, thus permitting air under pressure to flow to the operating cylinder 103 of the transmission unit 68. The remaining three-way valves 116 and 117 are similarly constructed and connected to the transmission units 69 and 70, respectively.

The valve operating cams and the mechanism for rotating them are so constructed that when the operating lever 129 is swung from the upper end of slot 130 to the lower end of the slot the valve cams 119, 120 and 121 rotate through seven-eighths of a revolution. Each cam has a different arrangement of peripheral lifting surfaces to effect operation of one or more of the respective plungers 122, 123 and 124 for the different positions of the camshaft. Thus Figures 9 to 12 show the position of the parts when the operating lever is opposite the indicia 8 alongside the slot 130, in which all three of the plungers 122, 123 and 124 are in their lowermost positions thus exhausting air from all three of the clutch operating cylinders and providing the maximum torque multiplication through transmission 9. Upon movement of the operating handle from the indicia 8 to the indicia 7, the camshaft will be rotated in a direction indicated by the arrows in Figures 10 through 12 by one-eighth of a revolution, thus bringing the raised portion 135 on cam 119 into position in which the elevation of the plunger 122 of valve 115 is effected. It will be noted that on a corresponding movement of the cams 120 and 121 no change in the position of plungers 123 and 124 occurs. On the next increment of movement of the camshaft 118, plunger 122 will be lowered and plunger 123 will be elevated by the raised portion 136 on cam 120. No change will take place in the condition of valve 117. On the next increment of movement plungers 122 and 123 will be elevated by raised cam portions 137 and 138 on cams 119 and 120 without any change in the condition of valve 117. On a further increment of movement plungers 122 and 123 will be released and plunger 124 will be elevated by the raised portion 139 on cam 121, thus eliminating the torque multiplication available in transmission unit 70 for the first time. On the next increment of movement plungers 122 and 124 will be elevated by the raised cam portions 140 and 141, and the plunger 123 will be released by cam 120. On the next increment of movement plunger 122 will be released by cam 119, and plungers 123 and 124 will be elevated by the raised portions 142 and 143 on cams 120 and 121 respectively. On the final movement of the camshaft all three of the plungers will be elevated by the raised portions 144, 145, and 146. It will be noted that the sequence of operation of the three valves is such as to produce the eight successive speed ratios referred to above in the proper order.

It will be noted that when it is necessary to release one valve plunger and elevate another to effect a ratio change that the releasing and elevating operations occur simultaneously and thus prevent the imposition of abnormal load conditions on any of the parts. Each of the elevated portions of the cams 119, 120, and 121 is provided with a depression adapted to fit the rounded end of the co-operating valve plunger. Since the plungers are normally urged downwardly, as viewed in Figure 8, either by a spring or by the air pressure at port 132, or both, the recesses in the raised portions of the cams operate as detents to retain the shaft lever 129 in any desired position of adjustment.

Figure 7:
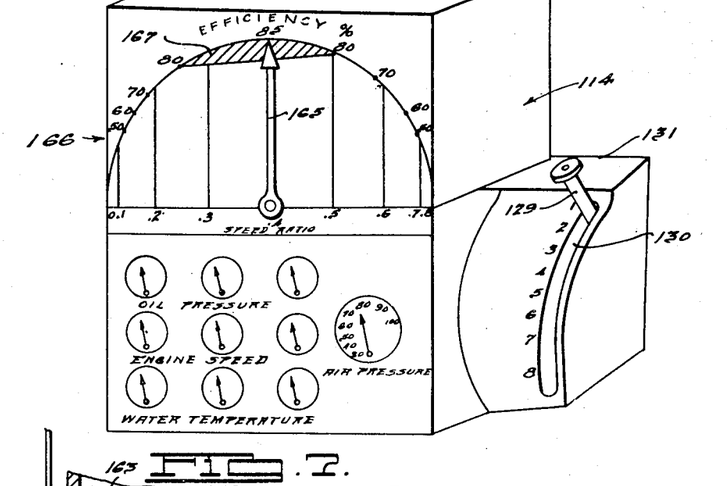
Figure 7 is a perspective view of the control and indicating panel utilized to control the operation of the apparatus.
Figure 8:
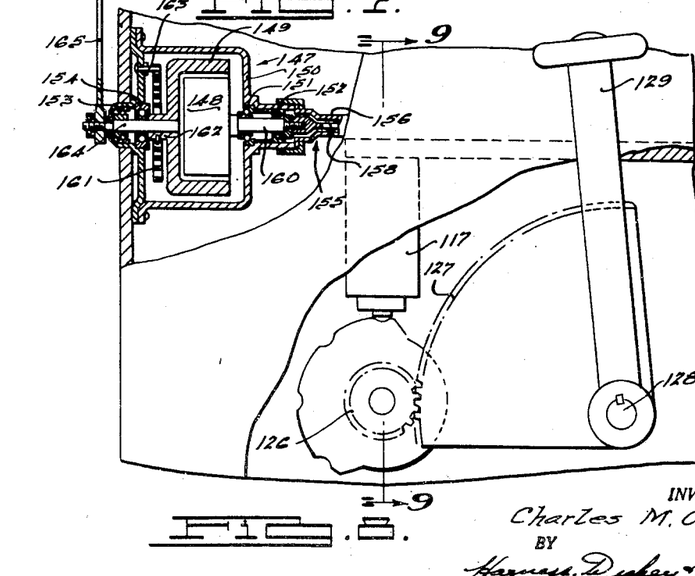
Figure 8 is an end view of the mechanism shown in Figure 7 with parts broken away to show the interior construction.
Figures 9, 10, 11, 12:
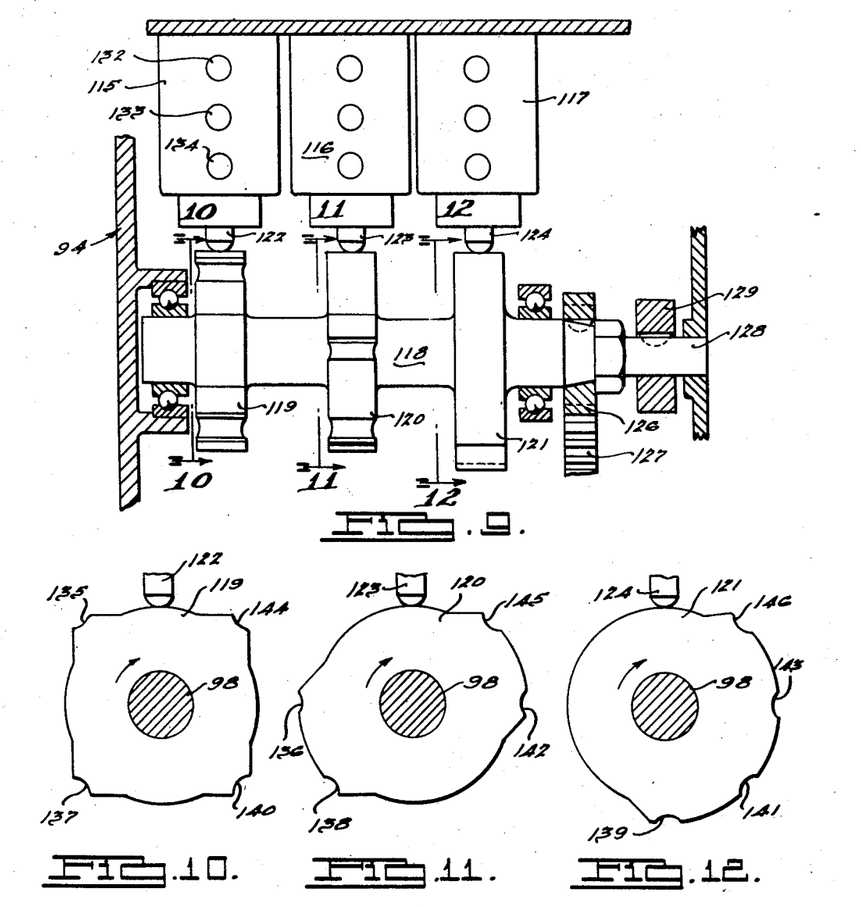
Figure 9 is a fragmentary section taken on the line 9—9 of Figure 8, with the parts in a different position.
Figures 10, 11 and 12 are sectional views of the valve operating cams taken on the lines 10—10, 11—11 and 12—12 in Figure 9.
Figure 13:
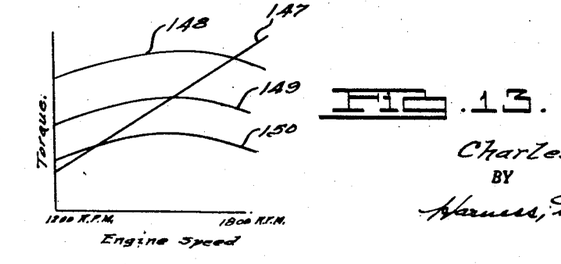
Figure 13 is a graph showing the torque characteristics of the engine and torque converter employed in the preferred form of the invention.

An important feature of the apparatus resides in the indicating device shown in Figures 7 and 8 for indicating the speed ratio and efficiency at which the torque converter is operating in order to guide the driller in selecting the proper speed ratios for transmission 9 by means of the lever 129.

The efficiency indicator may comprise any suitable mechanism for indicating the speed ratio at which the converter is operating but, for convenience of the operator, it is preferably calibrated in accordance with the efficiency of the particular torque converter employed. The speed ratio at which the converter is operating may be measured by any form of differential mechanism either mechanically or electrically responsive to the difference in speeds between the input and output shafts of the converter. However, a novel form of indicating means which is exceedingly simple in construction is illustrated in Figures 2, 7 and 8. As best shown in Figure 7, the indicating device, indicated generally at 147, is in the form of a magnetic eddy current coupling comprising a driving element 148 and a driven element 149, the driving element being located entirely within a cup-shaped depression in the driven element but being entirely disconnected therefrom. The driving and driven elements are independently journaled in a suitable casing 150 by means of antifriction bearings. Thus, the driving element is supported upon a pair of ball bearings 151 and 152 and the driven element is supported upon a pair of ball bearings 153 and 154.

The driving element is preferably formed as a multiple permanent magnet and the driven element 149 is formed of an electrically conductive material, in accordance with the usual practice in constructing electromagnetic couplings. The driving element 148 is rotated by any suitable means at a speed in proportion to the difference in speeds between the input and output shafts of the converter. This is readily effected in the apparatus of the present invention by connecting the driving element 148 to the differential mechanism in the cooling unit 42 by means of a speedometer cable, indicated generally at 155. The speedometer cable is constructed in the usual manner with a stationary tubular flexible housing 156 having one end fixed to the casing 150 of the indicator 147 and the other end connected to a suitable boss 157 formed on the housing for gears 65 and 66 of the fan drive, as best shown in Figure 2. The inner rotating element 158 of the speedometer cable has one end connected to a projection 159 on the shaft 62 of the fan drive, as shown in Figure 2, while its other end is fixed to the shaft 160 which carried the driving element 148 of the indicating device.

As a result of the mechanism so far described, it will be apparent that rotation of the driving element 148 of the indicating device in either direction will tend to effect corresponding rotation of the driven element 149, and that the rotating force transmitted between the elements 148 and 149 will be generally proportional to the difference between their speeds of rotation. A spiral spring 161 is provided to resiliently hold the driven element 149 in a neutral position and to resist rotational movement of the element from the neutral position in either direction. One end of the spring 161 is fixed to the hub 162 of the driven element 149 and the other end is fixed to a mounting screw 163 carried by the casing 150. The shaft 164 which carries the driven element 149 projects from the casing and supports an indicating pointer 165 which cooperates with any suitable form of efficiency and/or speed ratio indicating dial.

The preferred form of dial, indicated at 166 in Figure 7, comprises a semicircular line along which the pointer is adapted to move. The strength of the magnetic coupler and the strength of the spring 161, are so selected that the pointer will remain in a vertical position so long as the driving element 148 is stationary and will assume a position rotated 90° from the vertical in a counterclockwise direction, as viewed in Figure 7, when the output shaft of the converter is stationary and the input shaft is operating at the normal operating speed of the engine during hoisting. As a result of this arrangement, the pointer assumes its vertical position when the driving element 148 is stationary and thus, in that position, indicates that the torque converter is operating at maximum efficiency. Accordingly, as the speed ratio of the converter increases beyond that of maximum efficiency, the pointer will swing in a clockwise direction through an angle of 90° when the speed ratio of the converter is approximately double that of maximum efficiency. The particular form of dial illustrated is adapted for use in connection with a torque converter which reaches maximum efficiency at a speed ratio of .4 and, consequently, the right-hand extremity of the arcuate line represents a speed ratio of .8. From the known efficiency curve of the converter employed, the actual efficiency of the converter corresponding to a plurality of positions of the pointer along the arcuate line, may be determined and marked on the dial in the manner indicated in Figure 7. Likewise the corresponding speed ratios may be indicated along the horizontal line below the arcuate line, as indicated. In general, it is desirable to operate the converter within an efficiency range of five percent of its peak efficiency and, consequently, the dial is suitably marked at 167 to indicate the so-called efficient range of the converter. It will be noted that the efficient range of the particular converter to which the dial applies, ranges from a speed ratio of .25 to a speed ratio of .5.

It will be understood that the particular form of indicating device, disclosed in Figure 8, which incorporates a double acting spring, is required when the differential drive mechanism is designed to have a zero rotative speed when the torque ratio of the converter is at maximum efficiency. If an ordinary differential drive is used, the speed of the third member of the differential will be proportional to the difference in speeds between the input and output shafts. In that case a single acting spring may be used on the pointer and the pointer will assume its left-hand or zero speed ratio position when the speed of the driving member of the indicator is maximum. An intermediate speed of the driving member will represent the speed ratio of maximum efficiency.

As a result of the above indicating device and the provision of a manually shiftable transmission which can be shifted under load during hoisting operations, the driller is able to instantly adjust the speed ratios in the transmission as required to obtain the most effective drive connection to the hoisting drum. In this connection the automatic two-speed transmission greatly facilitates the operation of the unit and relieves the driller of the necessity of making frequent speed ratio changes. Thus, for example, if the proper speed ratio has been selected in the transmission 9 for hoisting any given stand of drill pipe, the pointer 165 of the efficiency indicator will move from its extreme left-hand position, as viewed in Figure 7, at the beginning of the hoisting operation when the starting torque is high, upwardly along the arcuate line in a clockwise direction. If the torque load falls off to such a point that the pointer reaches the maximum efficient speed ratio of .5, the automatic two-speed transmission 67 will automatically shift into a direct drive thereby returning the pointer to the minimum efficient speed ratio of .25. Thereafter further reductions in torque load may occur without taking the converter out of its efficient speed ratio range. If the driller observes that after the shift of the automatic transmission to direct drive, the pointer is swinging clockwise beyond the efficient range of the converter he may instantly shift the manually controlled transmission 9 to a lower torque multiplication ratio, or if the entire stand pipe is hoisted without a movement of the pointer 165 clockwise as far as the efficient speed ratio range, he may instantly shift the manually controlled transmission to a higher torque multiplcation ratio. These shifts can be made during the hoisting operation and, consequently, insure that the drill pipe will be hoisted at the maximum possible speed and efficiency at all times.

It is also preferred, as indicated in Figure 7, to incorporate in the control box 114 all other necessary indicating devices commonly employed in drilling operations, such as meters for indicating oil pressure, engine speed, water temperature, air pressure etc. It is particularly important in connection with apparatus of the present invention to employ individual engine speed indicating devices because, due to the fact that three engines will be driving the hoisting drum during the hoisting operations through individual torque converters, the output speed of the three torque converters will be the same and, consequently, the torque delivered by each engine will be exactly the same at any given engine speed. Accordingly, so long as the three engines are operating at the same speed, the driller knows all three are taking their share of the load.

While only one form of the invention is illustrated and described, and that form embodied in oil well drilling mechanisms, it is appreciated that the apparatus of the present invention may be modified as to details of construction and employed in other connections without departing from the spirit of the invention or the scope of the appended claims. Moreover, the automatic two-speed transmission unit 67, while desirable for some purposes, forms no part of the invention claimed in the present application and, hence, may be omitted, if desired.

What is claimed is:

1. A power transmission system, comprising a hydro-kinetic torque converter and a manually controlled change-speed transmission connected in series with the torque converter, and an indicating device for continuously indicating to the operator the relationship between the speed ratio of the converter and the converter speed ratio range of maximum efficiency as a guide to indicate when a need exists to change speed ratios in the transmission in order to effect operation of the converter at an efficient speed ratio.

2. A cable winding drum mechanism including a drum, a hydro-kinetic torque converter, a driving connection between the converter and drum including a change-speed transmission, and an indicating device for continuously indicating to the operator the relationship between the speed ratio of the converter and the converter speed ratio range of maximum efficiency as a guide to indicate when a need exists to change speed ratios in the transmission in order to effect operation of the converter at an efficient speed ratio, the speed ratio changing mechanism of said transmission being shiftable under load without disconnecting the drive connection through the transmission.

3. A power transmission system, comprising a hydro-kinetic torque converter and a manually controlled change-speed transmission connected in series with the torque converter, and an indicating device for continuously indicating to the operator the relationship between the speed ratio of the converter and the converter speed ratio range of maximum efficiency as a guide to indicate when a need exists to change speed ratios in the transmission in order to effect operation of the converter at an efficient speed ratio, said device including an indicating member, an indicating scale member associated with said indicating member, one of said members being movable relative to the other between predetermined limits, said scale bearing indicia representing efficiency values which are distributed over the length of the relative movement and progressively decrease in both directions along the length of the scale from an intermediate point thereon, resilient means biasing said members into a relative position in which the indicating member is opposite the point of maximum efficiency on said scale, and differentially driven eddy current clutch means adapted to be driven from the input and output of the converter for exerting a force proportional to the extent that the speed ratio of the converter departs from the speed ratio of maximum efficiency and tending to move said members relatively away from said relative position of maximum efficiency.

4. A power transmission system, comprising a hydro-kinetic torque converter and a manually controlled change-speed transmission connected in series with the torque converter, and an indicating device for continuously indicating to the operator the relationship between the speed ratio of the converter and the converter speed ratio range of maximum efficiency as a guide to indicate when a need exists to change speed ratios in the transmission in order to effect operation of the converter at an efficient speed ratio, said device including an indicating member, an indicating scale member associated with said indicating member, one of said members being movable relative to the other between predetermined limits, said scale bearing indicia representing efficiency values which are distributed over the length of the relative movement and progressively decrease in both directions along the length of the scale from an intermediate point thereon, resilient means biasing said members into a relative position in which the indicating member is opposite the point of maximum efficiency on said scale, a rotatable element for moving one of said members relative to the other, a rotatable driving element, means for transmitting from said driving element to said first element a torque proportional to the relative speeds between said elements, and differential means for driving said driving element from the input and output of the converter at a speed proportional to the extent that the speed ratio of the converter departs from the speed ratio of maximum efficiency and in opposite directions dependent upon whether the speed ratio of the converter exceeds or is less than the speed ratio of maximum efficiency.

5. A speed ratio indicating device for use with hydro-kinetic torque converters, including an indicating member, an indicating scale member associated with said indicating member, one of said members being movable relative to the other between predetermined limits, said scale bearing indicia representing efficiency values which are distributed over the length of the relative movement and progressively decrease in both directions along the length of the scale from an intermediate point thereon, resilient means biasing said members into a relative position in which the indicating member is opposite the point of maximum efficiency on said scale, and differentially driven eddy current clutch means adapted to be driven from the input and output of the converter for exerting a force proportional to the extent that the speed ratio of the converter departs from the speed ratio of maximum efficiency and tending to move said members relatively away from said relative position of maximum efficiency.

6. A speed ratio indicating device for use with hydro-kinetic torque converters, including an indicating member, an indicating scale member associated with said indicating member, one of said members being movable relative to the other between predetermined limits, said scale bearing indicia representing efficiency values which are distributed over the length of the relative movement and progressively decrease in both directions along the length of the scale from an intermediate point thereon, resilient means biasing said members into a relative position in which the indicating member is opposite the point of maximum efficiency on said scale, a rotatable element for moving one of said members relative to the other, a rotatable driving element, means for transmitting from said driving element to said first element a torque proportional to the relative speeds between said elements, and differential means for driving said driving element from the input and output of the converter at a speed proportional to the extent that the speed ratio of the converter departs from the speed ratio of maximum efficiency and in opposite directions dependent upon whether the speed ratio of the converter exceeds or is less than the speed ratio of maximum efficiency.

CHARLES M. O'LEARY.

REFERENCES CITED

The following references are of record in the file of this patent:

UNITED STATES PATENTS

| Number | Name | Date |
| --- | --- | --- |
| 1,962,538 | Toney | June 12, 1934 |
| 1,990,810 | Young | Feb. 12, 1935 |
| 2,022,689 | Rainsford | Dec. 3, 1935 |
| 2,085,805 | Jessen | July 6, 1937 |
| 2,142,248 | Le Feure | Jan. 3, 1939 |
| 2,175,940 | Jessen | Oct. 10, 1939 |
| 2,180,724 | Sheldon | Nov. 21, 1939 |
| 2,186,999 | Stone et al. | Jan. 16, 1940 |
| 2,242,945 | Edwards | May 20, 1941 |
| 2,262,747 | Banker | Nov. 18, 1941 |
| 2,302,714 | Pollard | Nov. 24, 1942 |
| 2,338,413 | DeFalco | Jan. 4, 1944 |
| 2,373,453 | Brunken | Apr. 10, 1945 |
| 2,387,901 | Haverstick | Oct. 30, 1945 |
| 2,405,546 | Archer | Aug. 13, 1946 |

FOREIGN PATENTS

| Number | Country | Date |
| --- | --- | --- |
| 452,415 | Great Britain | Aug. 21, 1936 |